United States Patent Office

3,321,603
Patented May 23, 1967

3,321,603
RECOVERY OF UREA FROM OFF-GASES FROM THE SYNTHESIS OF MELAMINE FROM UREA IN THE GAS PHASE WHICH HAVE BEEN FREED FROM MELAMINE
Guenther Hamprecht, Limburgerhof, Pfalz, Hermann Dieter Fromm, Ludwigshafen (Rhine), Matthias Schwarzmann, Limburgerhof, Pfalz, and Ludwig Vogel, Frankenthal, Pfalz, Germany, assignors to Badische Anilin- & Soda-Fabrik Aktiengesellschaft, Ludwigshafen (Rhine), Germany
No Drawing. Filed Mar. 23, 1965, Ser. No. 442,176
Claims priority, application Germany, Mar. 28, 1964, B 76,110
10 Claims. (Cl. 260—555)

The present invention relates to a process for the treatment of off-gas from the synthesis of melamine, such as are obtained in the thermal catalytic treatment of urea, to separate therefrom the melamine and the unreacted urea. In particular it relates to a process for separating urea from gases from which melamine has already been removed by fractional condensation.

It is known that melamine which has been obtained by heating urea with added ammonia in the presence of catalysts at temperatures of 280° to 450° C. and which occurs in the form of a gas mixture containing melamine, can be deposited by cooling on cold walls, the temperature of the cooling surface advantageously being regulated so that the carbon dioxide and ammonia are not separated as ammonium carbamate, as is the case at temperatures above 60° C. Apart from the fact that in this type of condensation the melamine separates in the form of firmly adherent crusts which it is difficult to remove from the walls, carbon dioxide and ammonia are not the only impurities in the vapor mixture containing melamine. Depending on the way in which the reaction has been carried out, the said vapor mixture always contains more or less large amounts of isocyanic acid which during dry separation of melamine recombines with ammonia to form urea which condenses out with the melamine so that the product obtained has to be purified by recrystallization.

To avoid this disadvantage, according to a prior art proposal, urea may be heated to reaction temperature in a first stage with the catalyst but with only a very small amount of ammonia so that the melamine formed remains on the catalyst. Then in a second stage the melamine is removed from the catalyst by an abundant supply of ammonia at the same temperature. Although this method gives purer products, carrying out such a sequence of operations—mixing urea with catalyst at relatively low temperature, heating the mixture to reaction temperature, keeping it at this temperature, subliming off the melamine formed with a large amount of ammonia at this temperature and finally cooling the catalyst again so that it may be remixed with urea—involves such disadvantages that it has not achieved any entry into industry.

It is also known that melamine may be separated from the reaction gas by cooling the latter to temperatures of 180° to 356° C. The gases may be cooled by bringing them into contact with a cold stream of inert gas, a cold inert liquid or a cold inert solid. The off-gas leaving the cooling zone is then further cooled to a temperature of 60° to 100° C. to remove the remainder of the melamine from the gas.

The further cooling of the gas freed from melamine may be carried out in condensers. Owing to the poor heat transfer between the hot gas and the cooling surface it is necessary to use very large heat exchanger surfaces. Moreover urea deposited on the cooling surface forms a firmly adherent insulating layer which further impairs the heat transfer from gas to cooling surface as its thickness increases so that the degree of efficiency of the cooler decreases progressively. Since it is necessary to clean the heat exchange surfaces periodically from deposited urea, for example by fusion, at least two condensers are required for continuous operation.

It is an object of the present invention to provide a simple and advantageous process for the recovery of urea from the off-gases from the synthesis of melamine from urea carried out in the gas phase and in the presence of catalysts, said off-gas being substantially freed from its melamine content by fractional condensation at 150° to 200° C., preferably 170° to 190° C., wherein the said incrustation is avoided. This object is achieved by bringing the off-gas into intimate contact with a melt of urea or a melt of a mixture of urea and its thermal decomposition products whose temperature is kept only slightly above its melting point.

For the fractional condensation of melamine from the off-gas such as is formed by the thermal catalytic treatment of urea, the off-gas may be mixed with colder gas to cool it to the said temperatures. The temperatures and amount of the colder gases are correlated so that after the whole amount of gas has been mixed they are adequate to keep the urea in the vapor phase.

The process may be carried out by bringing the reaction gas into contact in countercurrent or cocurrent with a recycled urea melt, the heat being withdrawn from the melt in a cooler.

An advantageous procedure is to use urea which is required for conversion to melamine for scrubbing the reaction gas so that urea deposited from the reaction gas may be utilized for conversion to melamine. Not only urea, but also small amounts of melamine contained in vapor phase or as dust in the gas are scrubbed out and returned to the reaction zone so that loss of yield is substantially precluded.

Since the completest possible removal of urea from the gas used for cooling the reaction gas is desirable, scrubbing with urea is advantageously carried out at the lowest possible temperature. To lower the melting point of the urea, a portion of the urea required for conversion into melamine may be previously converted into biuret, for example by passing carbon dioxide or another inert gas through the urea melt or by continually sucking off the ammonia formed during the formation of biuret. The content of biuret does not disturb the conversion of urea to melamine because biuret is gasified in the reaction zone into ammonia and isocyanic acid from which melamine is formed. The melt may also contain other decomposition products of urea, for example triuret, cyanuric acid, ammeline, ammelide or also melamine or melamine cyanurate, without impairing the scrubbing effect.

It has proved to be particularly advantageous to use a biuret content of about 20% by weight, because under the influence of reaction gas containing 66.66% by volume of ammonia at atmospheric pressure, this concentration is equivalent to the equilibrium concentration between urea and biuret. A urea melt containing about 20% by weight of biuret is fluid at 120° C. Lower temperatures are achieved by using eutectic mixtures of urea and biuret having a biuret content of about 40%, but biuret is slowly reconverted to urea under the influence of the reaction gases at atmospheric pressure.

The temperature of the melt is kept only slightly above its melting point. It may be kept for example at up to 50° C., preferably 10° to 20° C., above the melting temperature.

Cyanuric acid, which forms together with biuret, also does not exert any deleterious action in the gas scrubbing. Cyanuric acid may accumulate in the melt up to 40% by weight. The melt is then still capable of being pumped. Small amounts of melamine which remain in the gas during the separation of the melamine are also scrubbed out and react with the cyanuric acid to form melamine cyanurate. This remains suspended in a finely divided form in the melt and passes with the urea into the reaction zone where it is split into isocyanic acid and melamine. Isocyanic acid is also formed by thermal cracking of triuret and also reacts, like ammeline and ammelide, to form melamine in the reaction zone. Since a portion of the urea-biuret melt is continuously supplied to the melamine synthesis and is replaced by fresh melt, cyanuric acid and melamine cyanurate cannot accumulate in the scrubbing cycle to a sufficient extent to be troublesome.

By the process according to this invention, which may be carried out at atmospheric or superatmospheric pressure, it is possible to separate urea practically quantitatively from the reaction gas. The process has the great advantage that only a relatively small cooler to cool the urea melt is required instead of a gas cooler having large heat exchange surfaces.

The invention is further illustrated by the following examples.

Example 1

40 kg. per hour of a urea melt containing about 20% of biuret is converted to the extent of about 95% into melamine in a fluidized bed reactor with 165 kg. of a gas mixture of 2 parts by volume of ammonia and 1 part by volume of carbon dioxide in contact with an aluminum oxide catalyst. The reaction gas which leaves the reactor at a temperature of about 340° C. is then cooled to about 180° C. by being mixed in a cylindrical tube with 920 cu. m. per hour of the reaction gas which has been freed from melamine and urea and which is at 130° C., so that melamine is condensed out and deposited in a degree of purity of 99.6%. The reaction gas which still contains urea is then passed into the lower portion of a column having a height of about 300 cm. and a diameter of 72 cm. and filled with aluminum Raschig rings, and is scrubbed therein countercurrent with a urea melt containing about 20% of biuret and at a temperature of 120° C. The gas is thus cooled to about 130° C. and freed from urea and traces of melamine. The cooled gas mixture is used again for cooling the hot reaction gas to separate melamine. The melt of urea and biuret at about 130° C. which leaves the column is cooled again to 120° C. in a cooler operated by vapor cooling and resupplied by a circulating pump to the scrubbing column.

The amount of melt (40 kg. or 30 l.) required for conversion into melamine is removed per hour from the scrubbing cycle and makeup melt added from a reservoir. With an hourly exchange of 30 liters of melt, the residence time of the melt in the scrubbing cycle is about ten hours. The cyanuric acid content of the melt is less than 3%. The biuret is formed in the reservoir in which the urea is fused at the same time, by passing in about 500 liters per hour of carbon dioxide at 140° C. Under these conditions about five hours are required for the formation of 20% of biuret in the urea melt.

Scrubbers of other designs may be used instead of the column packed with Raschig rings described in this example.

Example 2

About 40 kg. per hour of a urea melt containing 25% of biuret is reacted with 165 kg. of a gas mixture of 2 parts by volume of $NH_3$ and 1 part by volume of $CO_2$ in contact with an aluminum oxide catalyst to form melamine as described in Example 1. The reaction gas is mixed with 920 cu. m. of reaction gas at about 130° C. which has been freed from urea, in order to separate the melamine.

The reaction gas, which still contains urea, is introduced into the upper portion of a jet condenser to effect further cooling and separation of urea. Four jets are arranged about the central gas inlet and urea melt containing 25% of biuret and at a temperature of 120° C. is injected through these jets. The jet condenser itself has a length of 5000 mm. and a diameter of 350 mm. The gas and melt are separated after they have left the condenser. The reaction gas, cooled to 130° C., is used for cooling the hot reaction gas and the urea melt is cooled to 120° C. in a cooler as described in Example 1.

The scrubbing cycle again has removed from it the amount of melt required for conversion to melamine and this is replenished by fresh melt.

We claim:

1. A process for recovering urea from the off-gas which has been obtained in a melamine synthesis from urea carried out in the gas phase and in the presence of catalysts and which has been freed from melamine by fractional condensation at from 150° to 200° C., wherein the off-gas is brought into intimate contact with a melt of urea, the temperature of said melt being kept above its melting point.

2. A process as claimed in claim 1 wherein the urea melt used is a melt of the urea required for the conversion to melamine.

3. A process as claimed in claim 1 wherein the temperature of the melt is kept up to 50° C. above the melting temperature.

4. A process as claimed in claim 1 wherein the melt is kept at a temperature which is from 10° to 20° C. above the melting temperature.

5. A process for recovering urea from the off-gas which has been obtained in a melamine synthesis from urea carried out in the gas phase and in the presence of catalysts and which has been freed from melamine by fractional condensation at from 150° to 200° C., wherein the off-gas is brought into intimate contact with a melt of urea and its thermal decomposition products, the temperature of the melt being kept above its melting point.

6. A process as claimed in claim 5 wherein the thermal decomposition product comprises at least one member selected from the group consisting of biuret, triuret, cyanuric acid, ammeline, ammelide, melamine and melamine cyanurate.

7. A process as claimed in claim 5 wherein the thermal decomposition product is biuret.

8. A process as claimed in claim 5 wherein the biuret content of the melt is 20% by weight.

9. A process as claimed in claim 5 wherein the temperature of the melt is kept up to 50° C. above the melting temperature.

10. A process as claimed in claim 5 wherein the melt is kept at a temperature which is from 10° to 20° C. above the melting temperature.

References Cited by the Examiner

UNITED STATES PATENTS 2,550,659 4/1951 Vingee _____ 260—249.7
3,116,294 12/1963 Marullo et al. _____ 260—249.7

ALEX MAZEL, *Primary Examiner.*

HENRY R. JILES, *Examiner.*